US012566735B2

(12) United States Patent
Mehta et al.

(10) Patent No.: US 12,566,735 B2
(45) Date of Patent: Mar. 3, 2026

(54) NETWORK FILE SYSTEM SERVER PROXY AND PROTOCOL TRANSLATION

(71) Applicant: Dell Products L.P., Round Rock, TX (US)

(72) Inventors: Viral Kirtikumar Mehta, JamKhambhalia (IN); George Mathew, Belmont, CA (US); Poornima Gupte, Pune (IN); Omkar Anand Ekbote, Pune (IN)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 18/545,681

(22) Filed: Dec. 19, 2023

(65) Prior Publication Data

US 2025/0200012 A1    Jun. 19, 2025

(51) Int. Cl.
*G06F 16/10* (2019.01)
*G06F 16/174* (2019.01)
*G06F 16/182* (2019.01)

(52) U.S. Cl.
CPC ........ *G06F 16/183* (2019.01); *G06F 16/1748* (2019.01)

(58) Field of Classification Search
CPC ........................... G06F 16/183; G06F 16/1748
See application file for complete search history.

(56) References Cited

U.S. PATENT DOCUMENTS

| | | | |
|---|---|---|---|
| 11,973,823 B1 | 4/2024 | Ghorpade et al. | |
| 12,229,017 B2 | 2/2025 | Shilane et al. | |
| 2012/0072540 A1 | 3/2012 | Matsuzawa | |
| 2016/0041882 A1* | 2/2016 | Kruse ................. | G06F 11/0727 |
| | | | 714/16 |
| 2017/0097941 A1 | 4/2017 | Graves, Jr. et al. | |
| 2019/0332495 A1* | 10/2019 | Fair ..................... | G06F 16/1734 |
| 2020/0137157 A1 | 4/2020 | Joseph et al. | |

FOREIGN PATENT DOCUMENTS

JP          2021089625 A  *  6/2021

* cited by examiner

*Primary Examiner* — Belix M Ortiz Ditren
(74) *Attorney, Agent, or Firm* — Chamberlain, Hrdlicka, White, Williams & Aughtry; Aly Z. Dossa

(57) ABSTRACT

One or more embodiments of the invention relates to a method of managing a file system, by using a cluster that includes an enhanced file system redirector proxy (FSRP) node and at least one namespace access node. The method may include obtaining, by the enhanced FSRP node, a request from a client, and in response to the request: performing a translation of the request to a cluster-readable format to obtain a cluster-readable request, determining a namespace access node of the cluster to service the cluster-readable request, sending the cluster-readable request to the namespace access node, obtaining confirmation of servicing of the cluster-readable request from the namespace access node, and providing a file handle to the client based on the confirmation of the servicing.

15 Claims, 7 Drawing Sheets

Enhanced File System Redirector Proxy (FSRP) Node 150

Network File System (NFS) Server 152

Cluster File System Manager 154

Namespace Node Mapping 156

NETWORK FILE SYSTEM SERVER PROXY AND PROTOCOL TRANSLATION

BACKGROUND

In an enterprise environment, clustering is frequently used. One version of clustering, failover clustering, allows for a plurality of nodes to work together to increase the availability and scalability of the nodes. Further, one version of clustering provides file system data storage for clients. This version may include a hierarchy of nodes each with a designated function for the servicing of file system data storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
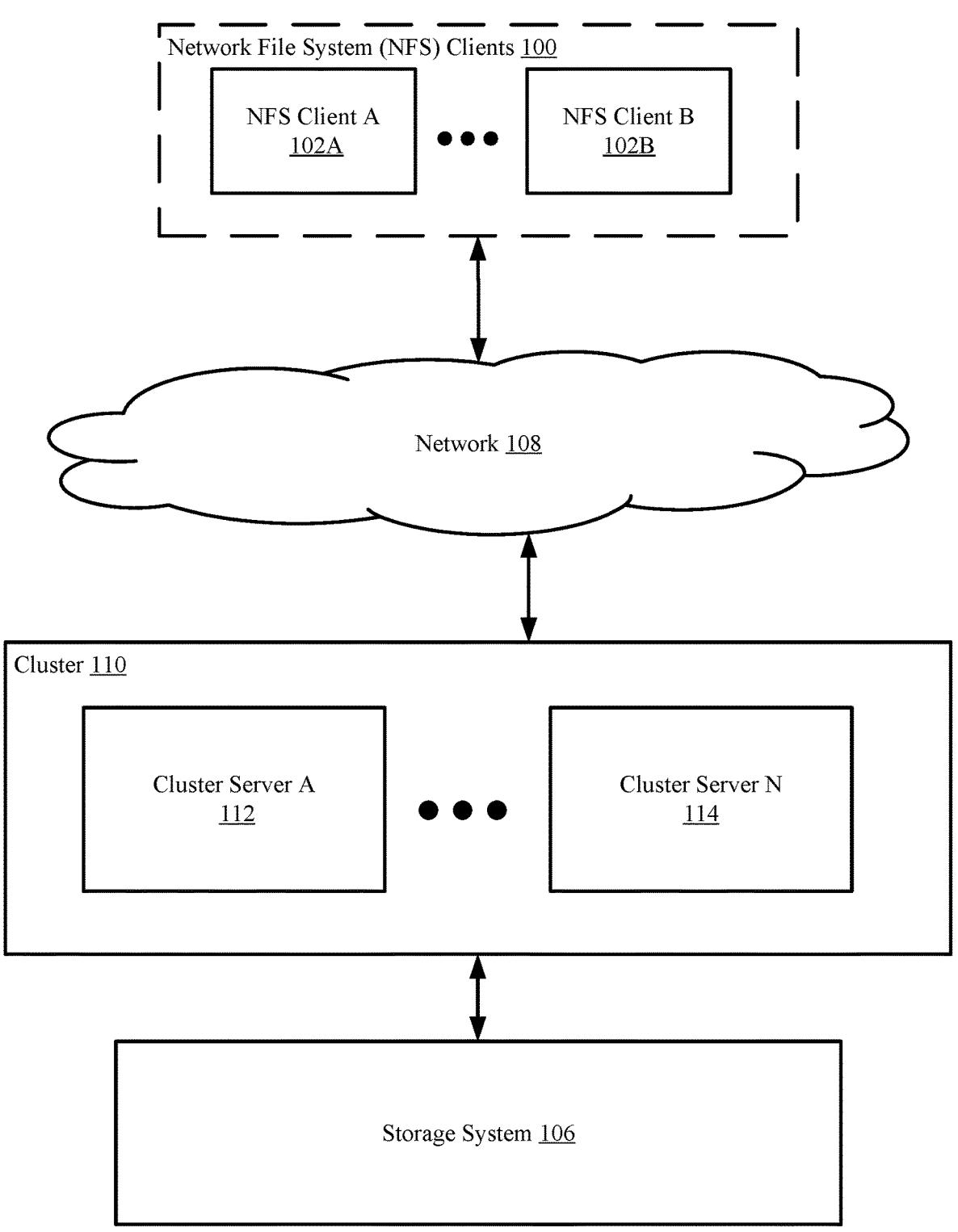
FIG. 1A shows a diagram of a system including a cluster in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regards to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to C. As used herein, the aforementioned labeling means that the element may include any number of items and does not require that the element include the same number of elements as any other item labeled as A to C. For example, a data structure may include a first element labeled as A and a second element labeled as C. This labeling convention means that the data structure may include any number of the elements. A second data structure, also labeled as A to C, may also include any number of elements. The number of elements of the first data structure and the number of elements of the second data structure may be the same or different.

In general, embodiments of the invention relate to system and methods for managing one or more file systems. More specifically, embodiments of the invention relate to a system that includes clients that operates its file system in a first protocol (e.g., a version of network file system (NFS)) and further includes a cluster that obtains input/output (I/O) requests in accordance with the first protocol and provides translation services of the obtained I/O requests into a second protocol readable to other nodes in the cluster. The cluster may include an enhanced file system redirector proxy (FSRP) node that One or more embodiments of the invention improves upon the traditional method of performing a restore, by either allowing a user or administrator to choose a preferred data node for performing a restoration, or by having a data protection manager or similar component of a system dynamically chose a preferred data node for performing a restoration based on the predetermined criteria. Such predetermined criteria may include each data node's load and workload as well as the type of backup that was performed to make the backup of the selected asset(s). This will allow for a more efficient restoration while avoiding overloading when restoring assets from a backup in a data cluster.

FIG. 1A shows a diagram of a system in accordance with one or more embodiments of the invention. The system may include a data protection manager (104), storage system (106), and at least one data cluster (110). The system may include any number of data clusters (100) without departing from the invention. For example, the system may include two data clusters (not shown) that communicate through a network (108). The system may include additional, fewer, and/or other components without departing from the invention. Each of the components in the system may be operatively connected via any combination of wireless and/or wired networks (108).

In one or more embodiments of the invention, the cluster (110) may include a plurality of nodes (e.g., 102A-102C), a cluster manager (110), and any number of NFS clients (e.g., 102A, 102B) without departing from the invention. The cluster may include any number of cluster servers (110, 112). For example, the cluster (110) may include two cluster servers (110, 112) that communicate through an internal network or by other means. The system may include additional, fewer, and/or other components without departing from the invention. Each of the components of the cluster may be operatively connected via any combination of wireless and/or wired networks (108).

In one or more embodiments of the invention, the cluster (110) includes the functionality to provide data protection services to the NFS clients (100). The data protection services may include storage of data using deduplication operations such that only unique data is stored in the storage system (106). In this manner, the cluster (110) may be a deduplication-aware cluster. The cluster servers (110, 112) may include the functionality to provide and/or obtain other and/or additional services without departing from the invention. While FIG. 1A shows the cluster (110) as a separate component from the storage system (106), it can be a part of the cluster (110) without departing from the invention.

In one or more embodiments, the cluster servers (110, 112) include functionality for obtaining requests from the NFS clients (102A, 102B) associated with files in a file system. The requests may be, for example, read or write requests. The requests may be in accordance with a version of a network file system (NFS) protocol. For example, the requests may be NFSv3 requests. The requests may specify writing new files, mounting a directory (or other files), reading new files, and/or other instructions without departing from the invention. The requests may be serviced using data stored in the storage system (106). For example, the cluster servers (110, 112), in response to obtaining the requests, may access the storage system (106) to read, write, and/or store data associated with the requests.

In one or more embodiments, the cluster (110) may include a second protocol for accessing data in the storage system (106). For example, a node in the cluster server (110) may operate in a protocol that is different from the NFS protocol of the NFS clients (100). The second protocol may be, for example, Data Domain Boost (DDBoost™). In this manner, the cluster servers (110, 112) include nodes (discussed in FIG. 1B) that include functionality for translating the requests (in the NFS protocol) to cluster-readable requests (e.g., in the DDBoost™ protocol) and servicing the cluster-readable requests in accordance with the NFS requests. The translation and servicing of the cluster-readable requests may be performed, for example, with FIGS. 2A-2B. The translation and the servicing may be performed in accordance with any other methods without departing from the invention.

Figure 4:
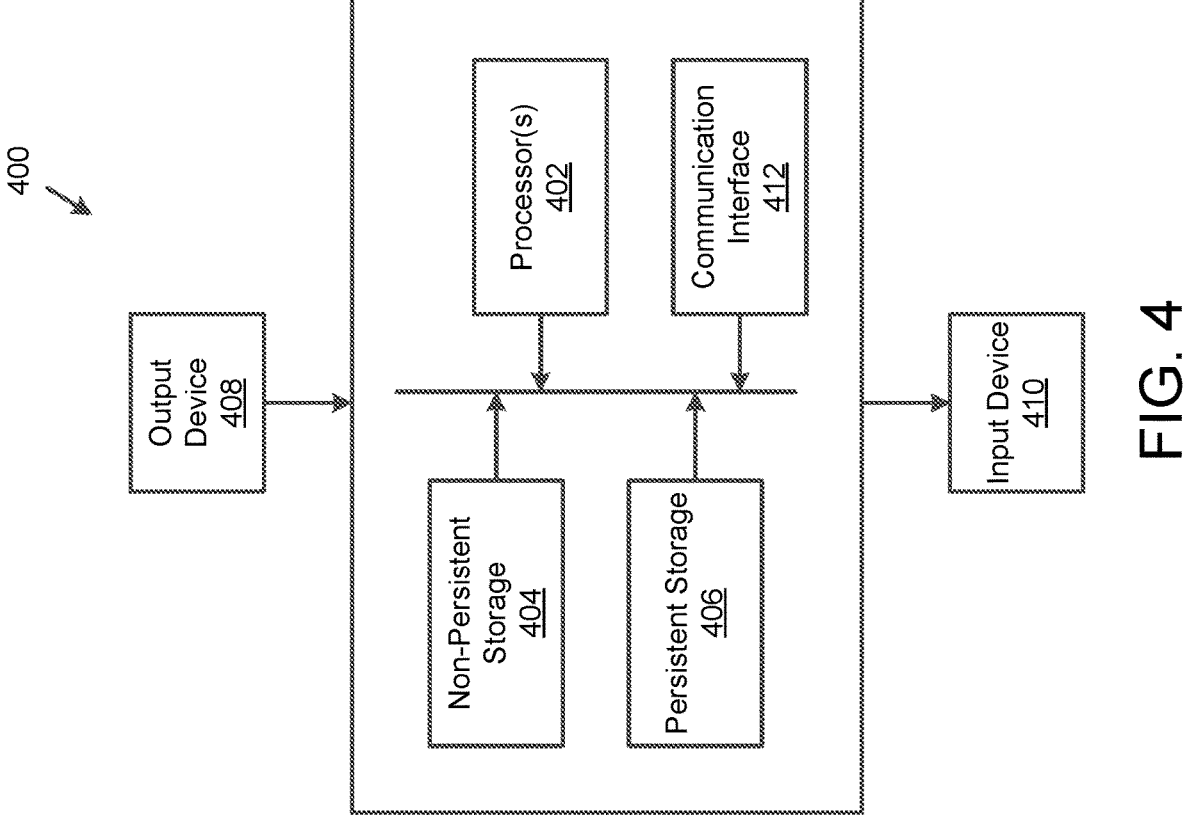
FIG. 4 shows a diagram of a computing device in accordance with one or more embodiments of the invention.

In one or more embodiments of the invention, each cluster server (110) is implemented as a computing device (see e.g., FIG. 4). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, it will cause the computing device to perform the functionality of the cluster server (110, 112) as described throughout this application.

In one or more embodiments of the invention, the cluster (110) works with a storage system (106) to store files and mapping information. The storage system (106) can comprise of local storage/volumes that are stored in any of the local storage devices of the storage system (106) or the nodes (See FIG. 1B) in the cluster (110). In one or more embodiments of the invention, the storage system (106) can comprise of storage that is not part of the cluster (110). Storage system (106) can also comprise of off-site storage including, but not limited to, cloud base storage and long-term storage such as tape drives, depending on the particular needs of the user and/or the system. The storage system (106) may include one or more processors, memory (e.g., random access memory) and persistent storage (e.g., disk drives, solid state drives, etc.).

In one or more embodiments of the invention, the storage system (106) includes the functionality to provide storage services to the cluster (110) as discussed above. The storage services may include (i) obtaining requests for data generated through the performance of computer implemented services from the cluster (110), (ii) storing data and metadata associated with the files in persistent storage of the storage system (106), and (iii) providing files to the cluster (110, 112) for read/write purposes and/or other purposes without departing from the invention. The storage services may include the functionality to provide and/or obtain other services without departing from the invention. The storage system (106) may include any number of storage devices without departing from the invention.

Figure 3:
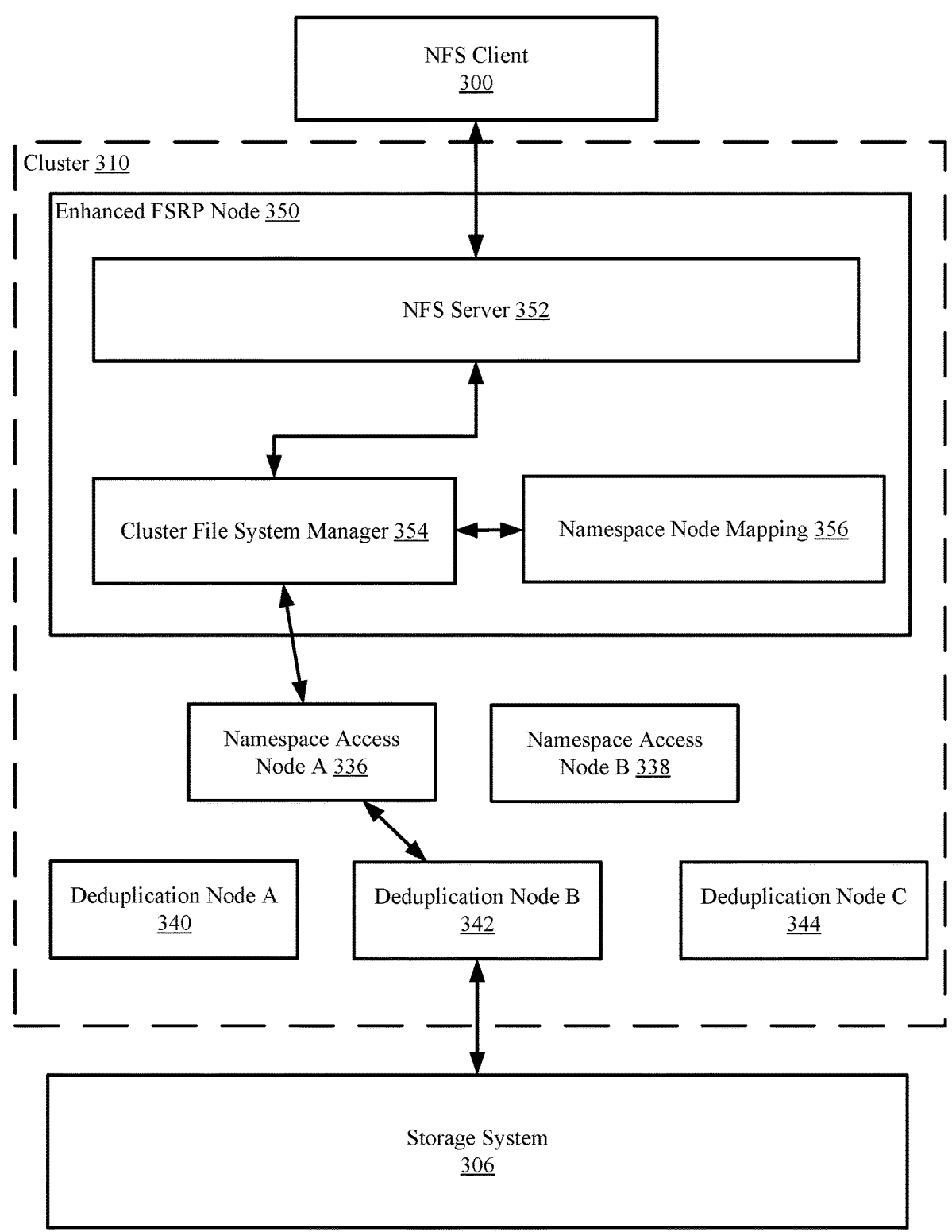
FIG. 3 shows an example in accordance with one or more embodiments of the invention.

In one or more embodiments of the invention, the storage system (106) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device it causes the computing device to perform the functionality of a storage system (106) as described throughout this application.

In one or more embodiments of the invention, the storage system (106) is implemented as a logical device. The logical device may utilize the computing resources of any number of computing devices and thereby provide the functionality of the storage system (106) as described throughout this application.

In one or more embodiments of the invention the NFS clients (110) and storage system (106), communicate with the cluster (110) through a network (108). The network (108) can take any form of network including any combination of wireless and/or wired networks. The network (108) can be a local network (LAN) or a wide area network (WLAN) including the Internet or a private enterprise network that connects more than one location. The network (108) can be any combination of the above networks, other known network, or any combination of network types.

In one or more embodiments of the invention, the network (108) allows the cluster (100) to communicate with other clusters (not shown) and external computing devices such as (but not limited to) a data protection manager (e.g., 104) and backup storage (e.g., 106). The various components of the cluster (110) may also communicate with each other through a network. The network may be a high-speed internal network and/or include part of an external network (108).

A network (e.g., network (108)) may refer to an entire network or any portion thereof (e.g., a logical portion of the devices within a topology of devices). A network may include a data center network, wide area network, local area network, wireless network, cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1A, the network (108) may include any number of devices within any components (e.g., 100, 110, and 106) of the system, as well as devices external to or between such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces which may provide connections (i.e., links) to other devices (e.g., computing devices, other network devices, etc.). In one or more embodiments, a network device also includes any number of additional components (not shown) such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, router, multilayer switch, fibre channel device, an InfiniBand® device, etc. A network device is not limited to the aforementioned specific examples.

In one or more embodiments of the invention, a cluster (e.g., 110) may be implemented as one or more computing devices. A data cluster (e.g., (110)) may include any number of computing devices without departing from the invention. The data cluster (e.g., 110) may include different numbers of computing devices, quantity, and types of computer resources, and may perform different computer implemented services without departing from the invention.

Figure 1B:
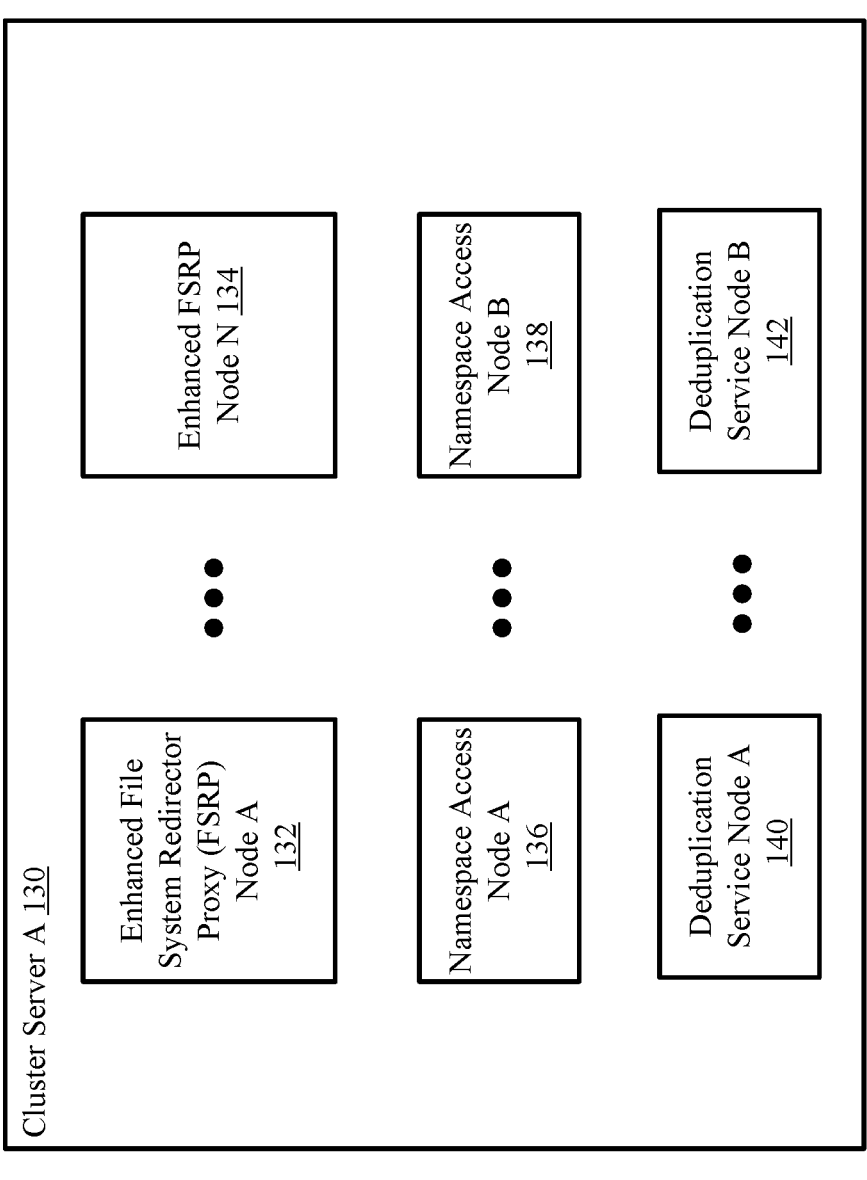
FIG. 1B shows a diagram of a cluster server in accordance with one or more embodiments of the invention.

FIG. 1B shows a diagram of a cluster server in accordance with one or more embodiments of the invention. The cluster server (130) of FIG. 1B may be an embodiment of a cluster server (112, 114, FIG. 1A) discussed above. The cluster server (130) may include one or more enhanced file system redirector proxy (FSRP) nodes (132, 134), one or more namespace access nodes (136, 138), and one or more deduplication service nodes (140, 142). Collectively, the enhanced FSRP nodes (132, 134), the namespace nodes (136, 138), and the deduplication service nodes (140, 142) may be referred to as cluster nodes of a cluster (e.g., 110, FIG. 1B).

While the cluster server (130) is illustrated as including cluster nodes such as enhanced FSRP nodes (132, 134), namespace access nodes (136, 138), and deduplication service nodes (140, 142), the cluster server (130) may only include one of these cluster nodes, additional cluster nodes, and/or different cluster nodes without departing from the invention.

In one or more embodiments of the invention, the cluster nodes perform workloads and provide services to clients and/or other entities not shown in the system illustrated in FIG. 1A. The cluster nodes may further include the functionality to perform computer implemented services for users (e.g., NFS clients, 100, FIG. 1A) of the cluster (110). The computer implemented services may include, for example, database services, electronic mail services, data processing services, etc. The computer implemented services may include other and/or additional types of services without departing from the invention.

During the performance of the aforementioned services, data may be generated and/or otherwise obtained. The cluster nodes include local storage (not shown) which may include multiple volumes, as well as shared storage which may include cluster shared volumes (not shown). The data storage services may include other and/or additional services without departing from the invention. The data generated and stored on the shared storages by the cluster nodes may be valuable to users of the system and therefore may be protected.

In one or more embodiments, the enhanced FSRP nodes (132,134) of the cluster nodes include functionality for obtaining NFS requests from the NFS clients (100, FIG. 1A) and translating the requests into cluster-readable requests for processing by the namespace access nodes (136, 138) and the deduplication service nodes (140, 142). The translation may be performed in accordance with, e.g., FIGS. 2A-2B. For additional details regarding the enhanced FSRP nodes, see e.g., FIG. 1C.

In one or more embodiments of the invention, one or more of the enhanced FSRP nodes (132, 134) are each implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the enhanced FSRP nodes (132, 134) described in this application and/or all, or portion, of the methods illustrated in FIGS. 2A-2B.

The enhanced FSRP nodes (132, 134) may each be implemented as a logical device without departing from the invention. The logical device utilizes computing resources of any number of physical computing devices to provide the functionality of the enhanced FSRP nodes (132, 134) described throughout this application and/or all, or a portion, of the methods described in FIGS. 2A-2B.

In one or more embodiments, the namespace access nodes (136, 138) are each assigned a portion of the file system to manage. For example, each access node is assigned one or more objects (e.g., a directory, a document, a file, a drive, etc.) of the file system such that all namespace access nodes (136, 138) in a cluster (e.g., 110, FIG. 1A) collectively are assigned to all objects in a file system. The assignment of objects may be performed, for example, by one or more of the enhanced FSRP nodes (132, 134).

In one or more embodiments of the invention, one or more of the namespace access nodes (136, 138) are each implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the namespace access nodes (136, 138) described in this application and/or all, or portion, of the methods illustrated in FIGS. 2A-2B.

The namespace access nodes (136, 138) may each be implemented as a logical device without departing from the invention. The logical device utilizes computing resources of any number of physical computing devices to provide the functionality of the namespace access nodes (136, 138) described throughout this application and/or all, or a portion, of the methods described in FIGS. 2A-2B.

In one or more embodiments, the deduplication service nodes (140, 142) include functionality for performing data storage services. The data storage services may include, for example, deduplication services. The deduplication services may include hashing an object (or the data or portion of data associated therein) to obtain a unique identifier of the object and/or data and/or portion of data. The unique identifier is compared to a table managed by the deduplication service node (140, 142) to determine if such object is stored in a storage system (e.g., 106, FIG. 1A). In this manner, duplicates of data are not stored and the storage resources of the storage system are made efficient.

In one or more embodiments of the invention, one or more of the deduplication service nodes (140, 142) are each implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the deduplication service nodes (140, 142) described in this application and/or all, or portion, of the methods illustrated in FIGS. 2A-2B.

The deduplication service nodes (140, 142) may each be implemented as a logical device without departing from the invention. The logical device utilizes computing resources of any number of physical computing devices to provide the functionality of the deduplication service nodes (140, 142) described throughout this application and/or all, or a portion, of the methods described in FIGS. 2A-2B.

In one or more embodiments of the invention, the cluster nodes include local storage which are only associated with only their assigned data node. The storage also includes shared storage such as a CSV. The storage can also include other types of shared volumes including active-passive shared volumes which only provide data storage services to the data nodes they are active on.

Figure 1C:
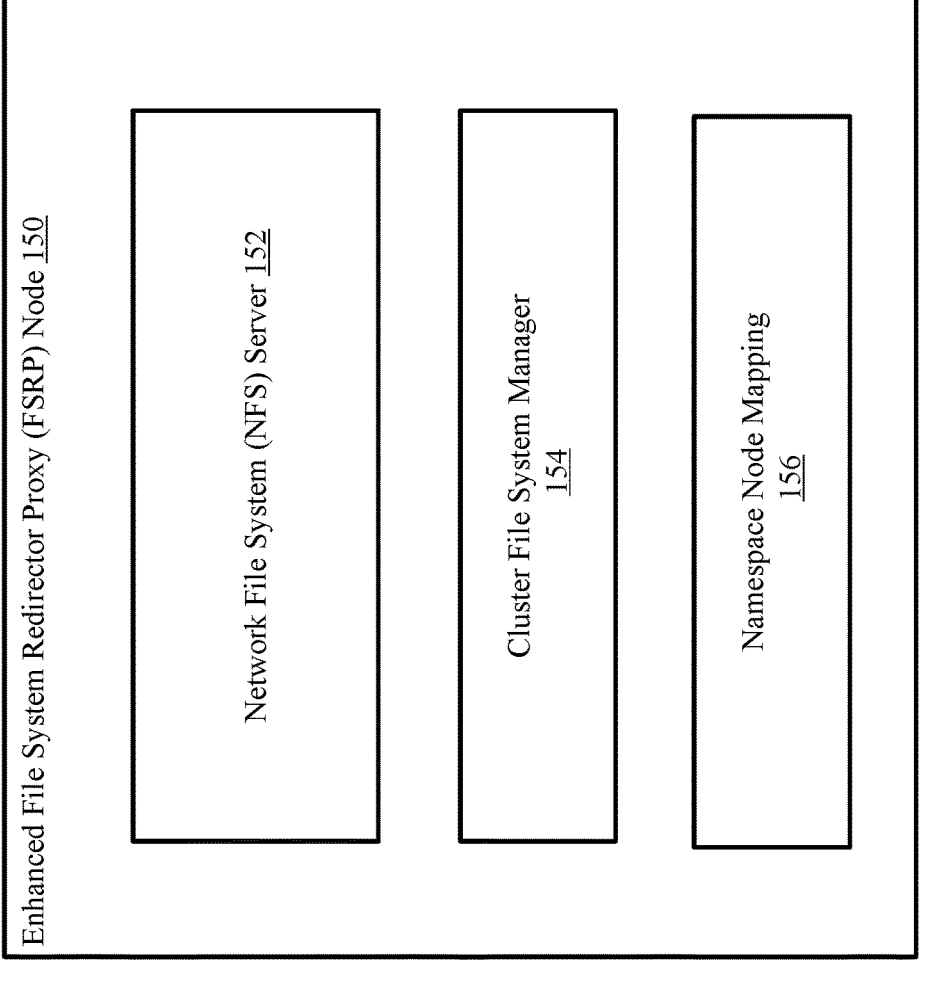
FIG. 1C shows a diagram of an enhanced file system proxy server (FSRP) node in accordance with one or more embodiments of the invention.

FIG. 1C shows a diagram of the enhanced FSRP node. The enhanced FSRP node (150) may be an embodiment of an enhanced FSRP node (132, 134, FIG. 1C) discussed above. The enhanced FSRP node (150) may include a network file system (NFS) server (152), a cluster file system manager (154), and a namespace node mapping (156). The enhanced FSRP node (150) may include additional, fewer, and/or different components without departing from the invention. Each of the aforementioned components of the enhanced FSRP node (150) is discussed below.

In one or more embodiments, the NFS server (152) includes functionality for processing NFS requests. Specifically, the NFS server (152) may obtain NFS requests from NFS clients and perform a translation of the NFS requests into a format readable to the rest of the cluster nodes in the cluster. The cluster-readable request generated by the NFS server (152) may be provided to the cluster file system manager (154).

In one or more embodiments, the NFS server (152) is implemented as a logical device without departing from the invention. The logical device utilizes computing resources of any number of physical computing devices to provide the functionality of the NFS server (152) described throughout this application.

In one or more embodiments, the cluster file system manager (154) includes functionality for communicating with other cluster nodes in the cluster to service requests (e.g., cluster-readable requests) based on the file system utilized by the cluster. The cluster file system manager (154) may perform the communication in accordance with FIGS. 2A-2B and FIG. 3.

In one or more embodiments, the cluster file system manager (154) uses a namespace node mapping (156) to determine the namespace access node (discussed above in FIG. 1B) that is mapped to a file specified in a request. The namespace node mapping (156) may be a data structure that maps each namespace access node in the cluster to the corresponding assigned files of the file system. The cluster file system manager (154) may further update the namespace node mapping (156) based on the new assigning of files in the file system. The namespace node mapping may be updated in accordance with, for example, FIG. 2A.

In one or more embodiments, the cluster file system manager (154) is implemented as a logical device without departing from the invention. The logical device utilizes computing resources of any number of physical computing devices to provide the functionality of the cluster file system manager (154) described throughout this application.

Figure 2A:
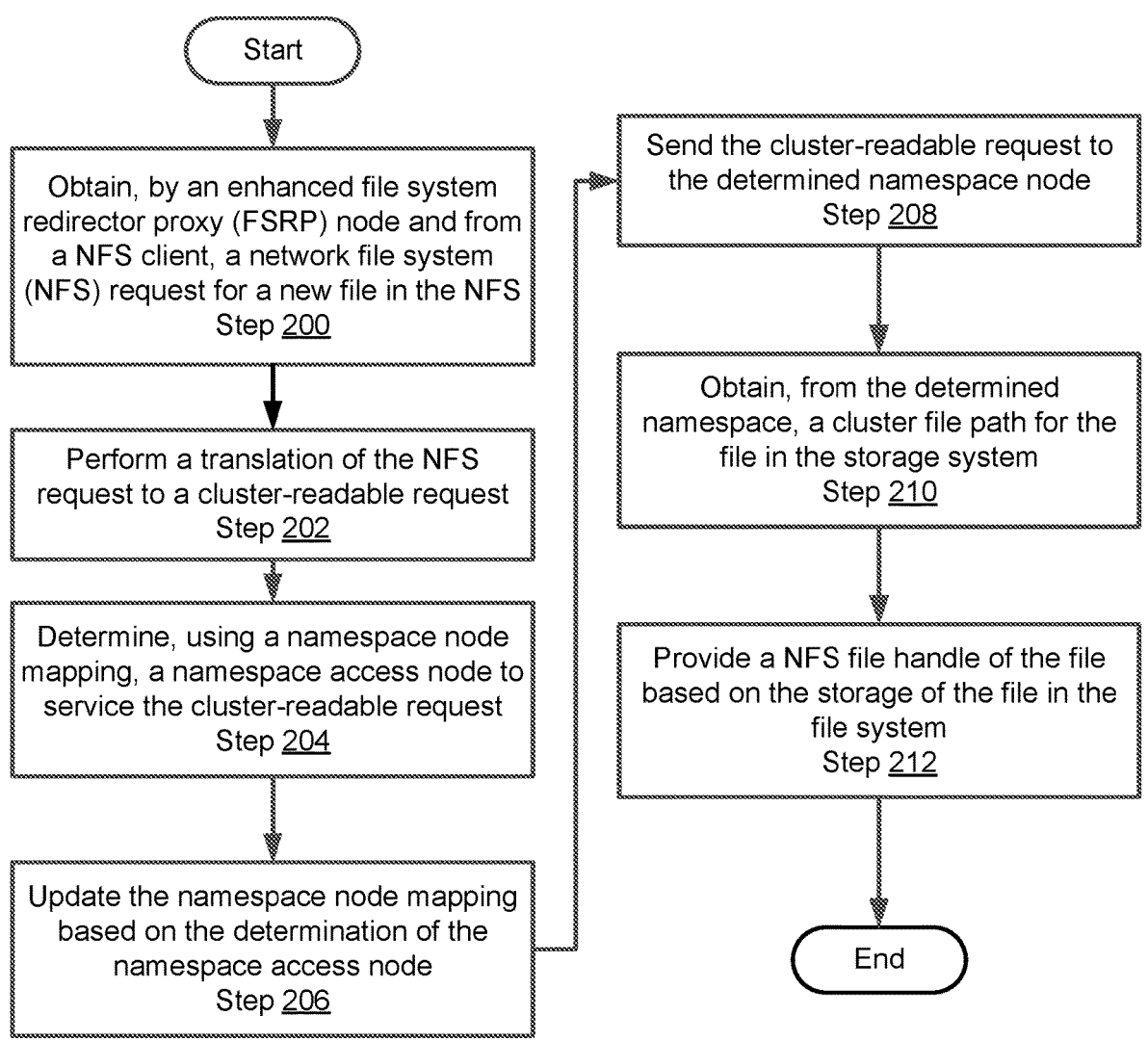
FIG. 2A shows a flowchart of a method for mounting a new file to a network file system (NFS) in the cluster in accordance with one or more embodiments of the invention.

FIG. 2A shows a flowchart of a method for mounting a new file to a network file system (NFS) in the cluster in accordance with one or more embodiments of the invention. The method may be performed by, for example, an enhanced FSRP node (132, 134, FIG. 1B). Other components of the system illustrated in FIGS. 1A-1C may perform all, or a portion, of the method of FIG. 2A without departing from the invention.

While FIG. 2A is illustrated as a series of steps, any of the steps may be omitted, performed in a different order, include additional steps, and/or perform any or all of the steps in a parallel and/or partially overlapping manner without departing from the invention.

In step 200, a NFS request for a new file in the network file system (NFS) is obtained. In one or more embodiments, the NFS request specifies writing the new file into the NFS. The NFS request may be in a NFS protocol.

In step 202, a translation of the NFS request to a cluster-readable request is performed. In one or more embodiments, the translation includes reading the NFS request for the new file, determining a new file in the local namespace of the cluster file system, and generating the cluster-readable request that is in the protocol readable by the other cluster nodes. For example, consider a scenario in which the cluster operates using a second file system protocol different from the NFS protocol of the NFS request. In this scenario, the cluster-readable request may be in the second file system protocol. The cluster-readable request may specify the new file in the local namespace.

In step 204, a namespace access node is determined to service the cluster-readable request. In one or more embodiments, the namespace access node is determined based on an availability of each of the namespace access nodes in the cluster. For example, the namespace access node that is most available (e.g., has the most available resources) may be selected. Other methods for determining the namespace access node may be implemented in step 204 without departing from the invention. The determining of the namespace access node may be performed by a cluster file system manager of the enhanced FSRP node.

In step 206, the namespace node mapping is updated based on the determination of the namespace access node in step 204. In one or more embodiments, the namespace node mapping is updated to specify the mapping between the new file and the determined namespace node. Further, the namespace node mappings of the other enhanced FSRP nodes in the cluster may be updated with the new determination. In this manner, other enhanced FSRP nodes may be equipped to service any future I/O requests for the new file.

The updating may be performed by the cluster file system manager of the enhanced FSRP node.

In step 208, the cluster-readable request is sent to the determined namespace access node. As discussed above, the cluster-readable request specifies writing the new file in the local namespace.

In one or more embodiments, the namespace access node services the cluster-readable request by utilizing one or more deduplication service nodes to perform the deduplication services prior to storing the data associated with the file in the storage system. An example of utilizing these cluster nodes in the system is provided in FIG. 3.

In step 210, a cluster file path is obtained for the file in the storage system. The cluster file path may be obtained from the namespace access node by the cluster file system manager. The cluster file path may be a file path of the new file based in the cluster file system. The cluster file path may be provided to the NFS server of the enhanced FSRP node. The NFS server may generate a NFS file handle based on the cluster file path and associated with the new file.

In step 212, the NFS file handle of the new file is provided to the client.

Figure 2B:
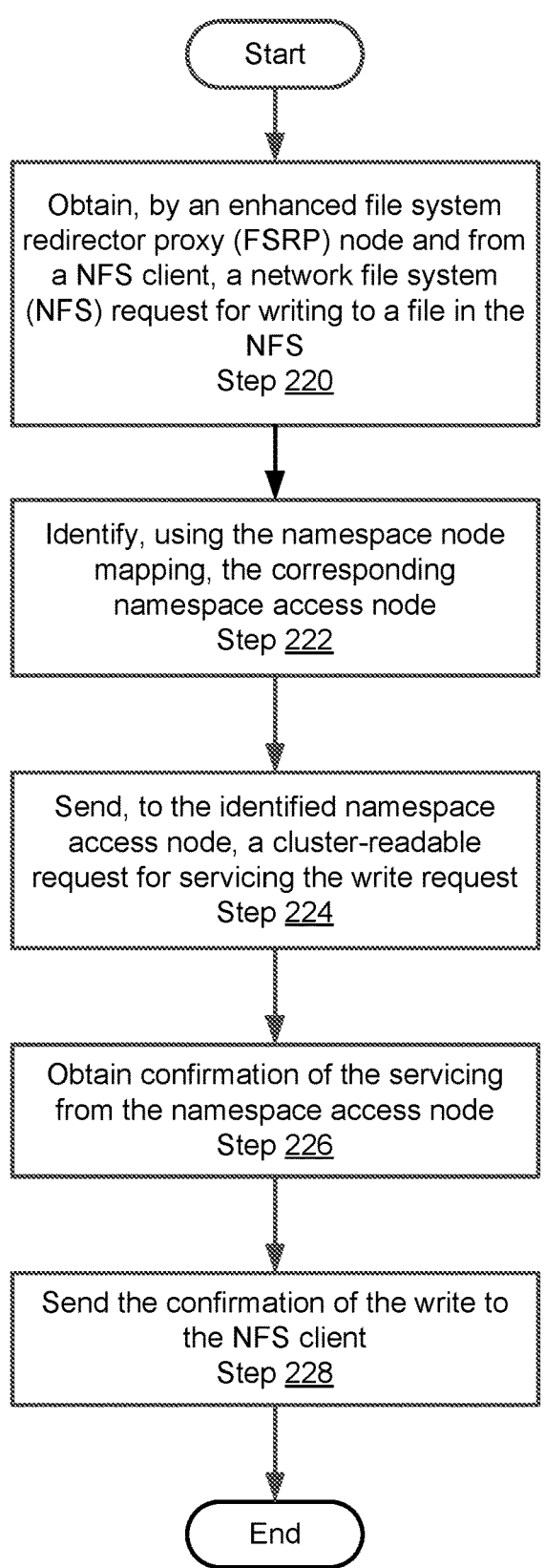
FIG. 2B shows a flowchart of a method for writing to the file in accordance with one or more embodiments of the invention.

FIG. 2B shows a flowchart of a method for writing to the file in accordance with one or more embodiments of the invention. The method may be performed by, for example, an enhanced FSRP node (132, 134, FIG. 1B). The enhanced FSRP node performing the method of FIG. 2B may be the same or different enhanced FSRP node of the method of FIG. 2A. Other components of the system illustrated in FIGS. 1A-1C may perform all, or a portion, of the method of FIG. 2B without departing from the invention.

While FIG. 2B is illustrated as a series of steps, any of the steps may be omitted or performed in a different order including additional steps, and/or perform any or all of the steps in a parallel and/or partially overlapping manner without departing from the invention.

In step 220, a NFS request for writing to a file in the NFS is obtained. In one or more embodiments, the file may be the new file generated in FIG. 2A. Similar to FIG. 2A, the NFS request of FIG. 2B may be in the NFS protocol.

In step 222, the corresponding namespace access node is identified using the namespace node mapping. In one or more embodiments, after the NFS server has translated the NFS request to a cluster-readable request, the cluster file system server may consult the namespace node mapping to determine that the corresponding namespace access node is mapped to the file.

In step 224, a cluster-readable request is sent to the identified namespace access node based on the NFS request. In one or more embodiments, the cluster-readable request is sent by the cluster file system manager. The cluster-readable request may specify writing to the new file in the local namespace of the cluster.

In one or more embodiments, the namespace utilizes the deduplication service nodes to service the cluster-readable request. The deduplication service node may perform deduplication services such as, for example, a hashing of the data to determine that the data is not stored in the storage system, and writing the data in the storage system.

In step 226, confirmation of the servicing is obtained from the namespace access node. The confirmation may specify the servicing of the cluster-readable request to write to the file in the local file system.

In step 228, the confirmation of the write request is sent to the NFS client. The confirmation may specify that the NFS request (i.e., the write request) is serviced.

Example

The following section describes an example. The example, illustrated in FIG. 3, is not intended to limit the invention. Turning to the example, consider a scenario in which a NFS client utilizes a scalable cluster to perform file system storage services for a NFS.

Turning to FIG. 3, FIG. 3 shows a diagram of an example system. For the sake of brevity, not all components of the example system are illustrated in FIG. 3. The example system includes at least a NFS client (300), a cluster (310), and a storage system (306). The NFS client (300) utilizes the cluster (310) for file system storage services such as storing and providing data of the NFS to the NFS client. The cluster includes an enhanced file system redirector proxy (FSRP) node (350), two namespace access nodes (336, 338), and three deduplication nodes (340, 342, 344).

The NFS client (300) mounts a NFS directory "\data\col1\nfs_exp" (also referred to as "the directory" in this example) for writing and reading files in the directory. The NFS client (300) communicates with a NFS server (352) of the enhanced FSRP node (350) to send NFS requests for reading, writing, and/or otherwise using files in the directory.

For example, the NFS client (300) may send two NFS requests for two new files (i.e., file1 and file2) to the directory. The NFS server (352) may perform the method of FIG. 2A to translate each of the two NFS requests into cluster-readable requests. The two cluster-readable requests are provided to a cluster file manager (354) of the enhanced FSRP node (350).

The cluster file system manager (354) consults with the namespace node mapping (356) to determine that the two files are not currently managed in the cluster. The two files may be assigned to one of the namespace access nodes (336) in accordance with the availability of the two namespace access nodes (336, 338). Based on such availability, the cluster file system manager (354) assigns namespace access node A (336) to manage the two files. Based on this assignment, the cluster file system manager (354) updates a namespace node mapping (356) to specify the mapping of namespace access node A (336) to file1 and file2.

The cluster file system manager (354), following this assignment, serves as a client for the storage of the data of file1 and file2, and communicates with deduplication node B (342) to request it to store the two files in the storage system (306). Deduplication node B (342) performs deduplication services such as hashing the data of file1 to obtain a first unique hash value, determining that the first unique hash value is not stored in a local mapping (not shown) of the deduplication nodes (340, 342, 344), and based on this determination, sends the data to the storage system (306) for storage. Similarly, deduplication node B (342) hashes the data of file2 to obtain a second unique hash value. Deduplication node B (342) determines that the second unique hash value is not specified in the local mappings, and based on this determination, sending the data to the storage system (306) for storage.

The deduplication node (342) sends confirmation of the storage to the namespace access node (336), which forwards such confirmation to the cluster file system manager (354). The NFS server (352) obtains this confirmation and provides the confirmation to the NFS client (300).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many diverse types of computing devices exist, and the aforementioned input and output device(s) may take other forms.

One or more embodiments of the invention may be implemented using instructions executed by one or more processors of the cluster manager. Further, such instructions may correspond to computer readable instructions that are stored on one or more non-transitory computer readable mediums.

One or more embodiments of the invention may improve the operation of one or more computing devices in a cluster environment. Specifically, embodiments of the invention relate to a method of providing file system storage services across a network using, for example a network file system protocol.

One or more embodiments of the invention relates to a method of leveraging existing cluster technology and their existing protocols to provide the file system storage services using NFS protocols by clients. With this technology, no additional software may be required on the NFS clients in response to the addition, removal, or otherwise scaling of cluster nodes in the cluster. Further, no change in protocol is required within the nodes in the deduplication-aware cluster. In this manner, data transfer services are provided by the cluster to clients operating using a NFS protocol despite the cluster operating in a different protocol such as DDBoost™. The NFS clients may remain agnostic to changes in the cluster, thus improving the user experience when using the deduplication-aware cluster to manage its data storage.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing a file system, the method comprising:

obtaining, by an enhanced file system redirector proxy (FSRP) node of a cluster and from a client, a request for a new file in a file system, wherein the cluster is a deduplication-aware cluster;

in response to the request:

performing a translation of the request to a cluster-readable format to obtain a cluster-readable request, wherein the request is in a first protocol, and wherein the cluster-readable request is in a second protocol;

determining a namespace access node of the cluster to service the cluster-readable request, wherein the determining comprises:

making a determination that the new file is not mapped to any namespace access nodes in the cluster;

analyzing, based on the determination, a plurality of namespace access nodes to determine resource availability of the namespace access nodes; and selecting, based on the analyzing, a namespace access node from the plurality of namespace access nodes with a highest resource availability to obtain the namespace access node;

sending the cluster-readable request to the namespace access node;

servicing, by the namespace access node and a deduplication node of the cluster, the cluster-readable request, wherein servicing the cluster-readable request comprises:

instructing, by the namespace access node, the deduplication node to store data corresponding to the file in a storage system, performing a deduplication operation on the data to obtain deduplicated data; and storing, by the deduplication node, the deduplicated data in the storage system;

obtaining, by the enhanced FSRP node, confirmation of servicing of the cluster-readable request from the namespace access node; and providing, by the FSRP node, a file handle to the client based on the confirmation of the servicing.

2. The method of claim 1, wherein the first request is in a network file system (NFS) protocol, and wherein the second protocol is a deduplication-aware protocol.

3. The method of claim 2, wherein the client manages a namespace in the NFS protocol, and wherein the cluster manages a namespace in a protocol different from the NFS protocol.

4. The method of claim 1, further comprising:

updating, based on the determining, a namespace node mapping to obtain an updated namespace node mapping.

5. The method of claim 4, further comprising:

after the providing:

obtaining, by the enhanced FSRP node and from the client, a write request for the file, wherein the write request specifies the file handle;

in response to the write request, identifying, using the updated namespace node mapping, the namespace access node;

sending a second cluster-readable request to the namespace access node, wherein the second cluster-readable request specifies writing to the data;

obtaining, from the namespace access node, a second confirmation of servicing of the second cluster-readable request; and in response to the second confirmation, providing the second confirmation to the client.

6. The method of claim 1, wherein a first cluster server in the cluster comprises the enhanced FSRP node and a second cluster server in the cluster comprises the namespace access node.

7. A system comprising:

a network file system (NFS) client; and a cluster comprising:

a first cluster server comprising a namespace access node, wherein the cluster is a deduplication-aware cluster;

a second cluster server comprising a processor and an enhanced file system redirector proxy (FSRP) node operating on the processor, wherein the enhanced file system is programmed to:

obtain a request for a new file in a file system;

in response to the request:

perform a translation of the request to a cluster-readable format to obtain a cluster-readable request, wherein the request is in a NFS protocol, and wherein the cluster-readable request is in a second protocol different from the NFS protocol;

determine the namespace access node to service the cluster-readable request, wherein the determining comprises:

making a determination that the new file is not mapped to any namespace access nodes in the cluster;

analyzing, based on the determination, a plurality of namespace access nodes to determine resource availability of the namespace access nodes; and selecting, based on the analyzing, a namespace access node from the plurality of namespace access nodes with a highest resource availability to obtain the namespace access node;

send the cluster-readable request to the namespace access node;

obtain confirmation of servicing of the cluster-readable request from the namespace access node; and provide a file handle to the NFS client based on the confirmation of the servicing, wherein the namespace access node is programmed to:

instruct the deduplication node to store data corresponding to the file in a storage system, wherein the deduplication node is programmed to;

perform, in response to the instructing, a deduplication operation on the data to obtain deduplicated data; and store the deduplicated data in the storage system.

8. The system of claim 7, wherein the NFS client manages a namespace in the NFS protocol, and wherein the cluster manages a namespace in the second protocol.

9. The system of claim 7, wherein the enhanced FSRP node is further programmed to:

update, based on the determining, a namespace node mapping to obtain an updated namespace node mapping.

10. The system of claim 9, further comprising:

the storage system, wherein the enhanced FSRP is further programmed to, after the providing:

obtain, from the NFS client, a write request for the file, wherein the write request specifies the file handle;

in response to the write request, identify, using the updated namespace node mapping, the namespace access node;

sending a second cluster-readable request to the namespace access node, wherein the second cluster-readable request specifies writing to the data in the storage system;

obtaining, from the namespace access node, a second confirmation of servicing of the second cluster-readable request; and in response to the second confirmation, providing the second confirmation to the client.

11. A non-transitory computer readable medium comprising computer readable program code, which when executed by a computer processor enables the computer processor to perform a method for managing a file system, the method comprising:

obtaining, by an enhanced file system redirector proxy (FSRP) node of a cluster and from a client, a request for a new file in a file system, wherein the cluster is a deduplication-aware cluster;

in response to the request:

performing a translation of the request to a cluster-readable format to obtain a cluster-readable request, wherein the request is in a first protocol, and wherein the cluster-readable request is in a second protocol;

determining a namespace access node of the cluster to service the cluster-readable request, wherein the determining comprises:

making a determination that the new file is not mapped to any namespace access nodes in the cluster;

analyzing, based on the determination, a plurality of namespace access nodes to determine resource availability of the namespace access nodes; and selecting, based on the analyzing, a namespace access node from the plurality of namespace access nodes with a highest resource availability to obtain the namespace access node;

sending the cluster-readable request to the namespace access node;

servicing, by the namespace access node and a deduplication node of the cluster, the cluster-readable request, wherein servicing the cluster-readable request comprises:

instructing, by the namespace access node, the deduplication node to store data corresponding to the file in a storage system;

performing a deduplication operation on the data to obtain deduplicated data; and storing, by the deduplication node, the deduplicated data in the storage system;

obtaining confirmation of servicing of the cluster-readable request from the namespace access node; and providing a file handle to the client based on the confirmation of the servicing.

12. The non-transitory computer readable medium of claim 11, wherein the request is in a format readable in a network file system (NFS) protocol.

13. The non-transitory computer readable medium of claim 12, wherein the client manages a namespace in the NFS protocol, and wherein the cluster manages a namespace in a protocol different from the NFS protocol.

14. The non-transitory computer readable medium of claim 11, further comprising:

updating, based on the determining, a namespace node mapping to obtain an updated namespace node mapping.

15. The non-transitory computer readable medium of claim 14, further comprising:

after the providing:

obtaining, by the enhanced FSRP node and from the client, a write request for the file, wherein the write request specifies the file handle;

in response to the write request, identifying, using the updated namespace node mapping, the namespace access node;

sending a second cluster-readable request to the namespace access node, wherein the second cluster-readable request specifies writing to the data;

obtaining, from the namespace access node, a second confirmation of servicing of the second cluster-readable request; and in response to the second confirmation, providing the second confirmation to the client.

* * * * *